United States Patent
Saha et al.

(10) Patent No.: US 11,348,146 B2
(45) Date of Patent: May 31, 2022

(54) ITEM-SPECIFIC VALUE OPTIMIZATION TOOL

(71) Applicant: Walmart Apollo, LLC, Bentonville, AR (US)

(72) Inventors: Sujoy Saha, Kolkata (IN); Gopikrishnan Anilkumar, Trivandrum (IN); Madhur Sarin, Gurgaon (IN); Ankur Verma, Ranchi (IN); Namrata Rawat, Faridabad (IN); Nikhil Varughese Cherian, Bentonville, AR (US); Mahesh Devendra, Udupi (IN)

(73) Assignee: Walmart Apollo, LLC, Bentonville, AR (US)

( * ) Notice: Subject to any disclaimer, the term of this patent is extended or adjusted under 35 U.S.C. 154(b) by 929 days.

(21) Appl. No.: 16/020,716

(22) Filed: Jun. 27, 2018

(65) Prior Publication Data
US 2019/0355030 A1 Nov. 21, 2019

(30) Foreign Application Priority Data
May 16, 2018 (IN) .............................. 201841018280

(51) Int. Cl.
*G06Q 10/04* (2012.01)
*G06Q 30/02* (2012.01)
*G06Q 10/08* (2012.01)

(52) U.S. Cl.
CPC ......... *G06Q 30/0283* (2013.01); *G06Q 10/04* (2013.01); *G06Q 10/087* (2013.01); *G06Q 30/0206* (2013.01)

(58) Field of Classification Search
None
See application file for complete search history.

(56) References Cited

U.S. PATENT DOCUMENTS

| 5,491,629 | A | 2/1996 | Fox et al. |
| 5,596,493 | A | 1/1997 | Tone et al. |
| 6,584,447 | B1 | 6/2003 | Fox et al. |
| 7,133,848 | B2 | 11/2006 | Phillips et al. |
| 7,689,456 | B2 | 3/2010 | Schroeder et al. |
| 8,140,381 | B1 | 3/2012 | Wu et al. |
| 8,639,558 | B2 | 1/2014 | Desai et al. |

(Continued)

OTHER PUBLICATIONS

A. Okay Akyuz, Ensemble Approach for Time Series Analysis in Demand Forecasting, 2017 (Year: 2017).*

(Continued)

*Primary Examiner* — Cory W Eskridge

(57) ABSTRACT

Elasticity of a particular product is calculated based on product demand against various price points. Accurate product demand calculations are ensured by calculating the price journey of the product, with appropriate adjustments made for out of stock conditions and promotions and or discounts. The price journey data is then input into an impact estimation algorithm which allows calculation of demand elasticity accounting for various real-world factors impacting demand and elasticity, such as: price of a substitute or compliment, competitor price, weather, local events, calendar events, and other factors. This approach allows for superior price journey-based item-specific elasticity calculation, which allows for superior optimization of item price to maximize volume and profit.

20 Claims, 8 Drawing Sheets

(56) References Cited

U.S. PATENT DOCUMENTS

| | | | |
|---|---|---|---|
| 2007/0299743 A1 | 12/2007 | Staib et al. | |
| 2009/0327037 A1 | 12/2009 | Ng et al. | |
| 2011/0153386 A1 | 6/2011 | Kim et al. | |
| 2012/0254092 A1 | 10/2012 | Malov et al. | |
| 2017/0116631 A1* | 4/2017 | Sarin | G06Q 30/0206 |

OTHER PUBLICATIONS

M. Karan, The impact of training data tailoring on demand forecasting models in retail, May 26, 2014 (Year: 2014).*

M. Seeger, Approximate Bayesian Inference in Linear State Space Models for Intermittent Demand Forecasting at Scale, Sep. 22, 2017 (Year: 2017).*

Young, Lee W., "International Search Report", International Application No. PCT/US/1926666, dated Jul. 9, 2019, 2 pages.

Young, Lee W., "Written Opinion", International Application No. PCT/US/1926666, dated Jul. 9, 2019, 4 pages.

* cited by examiner

ITEM-SPECIFIC VALUE OPTIMIZATION TOOL

BACKGROUND

Many environments use elasticity to understand changes in supply and demand, and how these changes may be tied to economic factors such as change in pricing, inflation, and consumer income. Some products or services may be found to be inelastic, meaning that a change in value does not noticeably affect supply or demand for that item. Many factors may impact supply and demand, and these factors may vary across different markets.

Product demand against a value, or price point, is used to calculate the elasticity of a particular product. Inaccurate demand results in inaccurate elasticity calculations. Demand of a product may be calculated by simply the number of units sold against a particular price without any consideration of the number of days the price point was active in a store, but this is an inaccurate measure as it does not consider the duration of each specific price. Accuracy is further diminished when the calculation of the price point fails to consider the following issues: price points for the same products can vary across stores within the same market; multiple temporary discounts or promotions occur in various stores in same market during the calendar year; and products can be out of stock in stores.

Demand, and thus elasticity calculation, is impacted when a store makes a price change under the influence of all other contributing factors such as price of a substitute or compliment, competitor price, weather, local events, calendar events, and other factors. These factors are ignored by tools which assume that the price of an individual item is the only contributing factor towards sales. Without mitigating this issue by measuring the impact of relevant factors, effective pricing decisions cannot be made, and elasticity calculations are rendered less accurate.

SUMMARY

Examples of the disclosure provide a system and method for item-specific value optimization. A value optimization component receives a data request for an item and obtains item-entity data corresponding to the item and one or more individual entities. The value optimization component generates one or more entity-specific item value arrays for the item based on the obtained item-entity data, and also generates volume data associated with the item based on the one or more entity-specific item value arrays. The value optimization component calculates individual durations for individual item values of the one or more item values based on the volume data, and a normalization component identifies one or more entity-specific factors associated with the item-entity data and normalizes the volume data based on the one or more entity-specific factors and the calculated individual durations. The normalization component generates an item-specific value optimization output based on the normalized volume data.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Corresponding reference characters indicate corresponding parts throughout the drawings.

DETAILED DESCRIPTION

Figure 1:
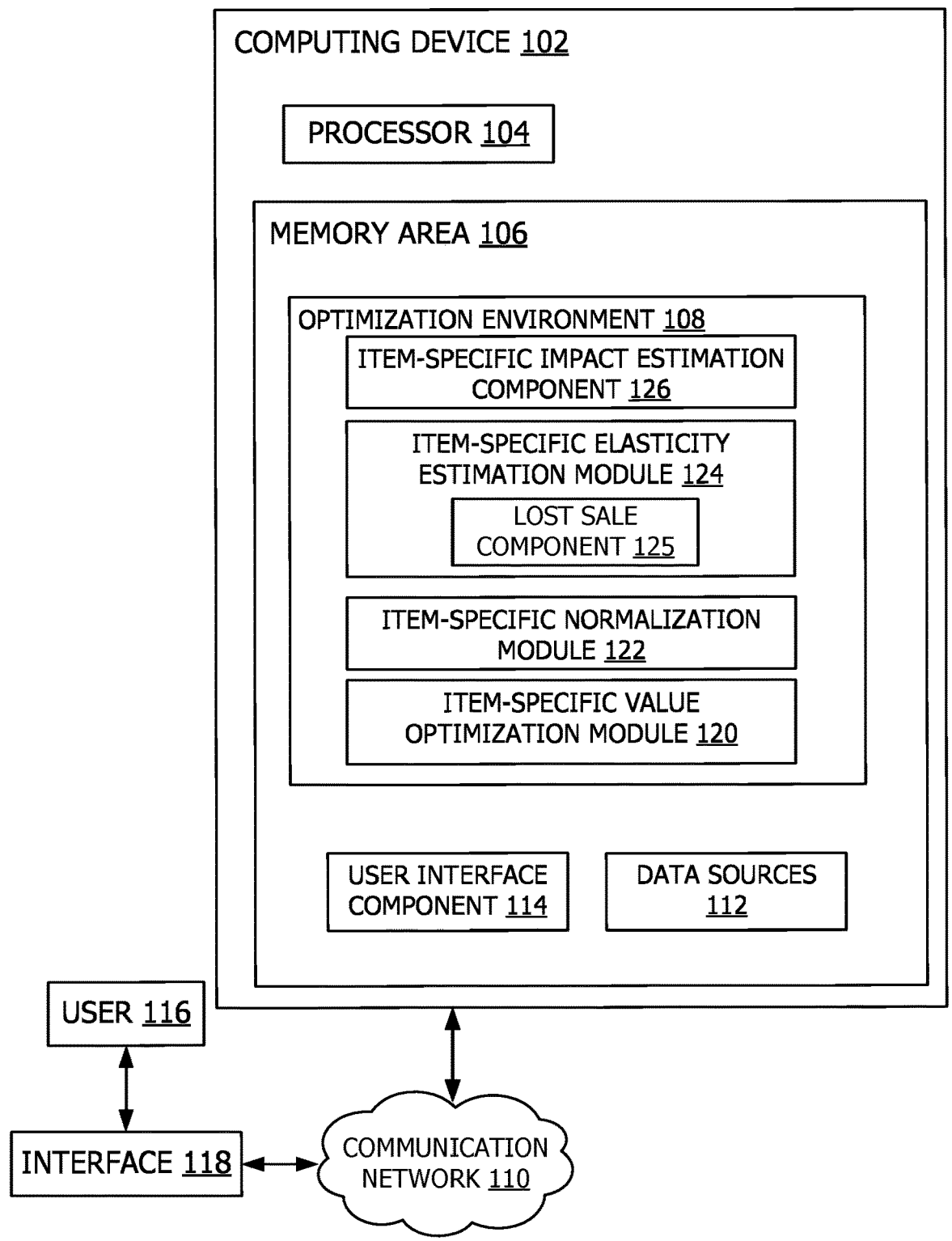
FIG. 1 is an exemplary block diagram illustrating a computing device for item-specific value optimization.

Referring to the figures, examples of the disclosure enable item-specific value optimization for items at an item-market level. As used herein, an entity may refer to a business entity, such as a retail business for example, and examples are provided that may describe a retail business environment. However, aspects of the disclosure are not limited to a retail or business environment. Elasticity estimation generally focuses on supply and demand for a specific product in the marketplace. As used herein, an individual entity may refer to a specific, physical location, such as a physical store location, with each individual entity representing a separate, physical store location within a possible chain of stores, for example.

Product demand (e.g., volume) against a price point is used to calculate the elasticity of a particular product. Accurate product demand calculations at the individual market level are useful in generating accurate product elasticity calculations for that market. In this disclosure, accuracy is obtained by calculating the price journey of the product to derive each of the price points that product actively sold at in a market across all the stores in that market, and the total number of days that each price point was active across the entire market, with appropriate adjustments made for out of stock conditions and promotions and/or discounts that could distort the demand calculation, for example. The price journey data then can function as an input into an impact estimation algorithm which allows calculation of demand elasticity using a methodology which takes into account various real-world factors which can impact demand/sales (and thus elasticity), such as: price of a substitute or compliment, competitor price, weather, local events, calendar events, and other factors. Use of the price journey and impact estimation algorithms together in this fashion allows for more accurate item-specific elasticity calculations, which in turn allow for improved optimization of item price to maximize volume, and thus maximize profit.

Price Journey Algorithm Overview

Understanding the price journey of an item in a market containing multiple offline stores allows estimating the right demand of the product in a market at a particular price, and thus allows elasticity calculations. The price journey algorithm embodied by the disclosure is illustrated using the following example with a record of point of sale (POS) data in a market as shown in the table below. The POS data of a particular product (e.g., shampoo) across two stores in a particular geographical area/market (M1) is shown. The elasticity is calculated at a market level—there will be a single elasticity figure for shampoo for the market M1.

| PRODUCT ID | PRODUCT NAME | STORE NUMBER | VISIT DATE | PRICE (US DOLLARS (USD)) | SALES VOLUME (UNITS) |
|---|---|---|---|---|---|
| Prod1 | Shampoo | Store1 | 1 Jan. 2016 | 10 | 10 |
| Prod1 | Shampoo | Store1 | 5 Jan. 2016 | 12 | 8 |
| Prod1 | Shampoo | Store2 | 15 Jan. 2016 | 10 | 7 |
| Prod1 | Shampoo | Store2 | 20 Jan. 2016 | 8 | 15 |
| Prod1 | Shampoo | Store1 | 28 Jan. 2016 | 9 | 12 |

If all the price-volume data points are used to calculate the elasticity-10 USD-10 units; 12 USD-8 units; 10 USD-7 units; 8 USD-15 units; 9 USD-12 units—the result may not be accurate, as the price of 10 USD was active in Store1 for five days, selling ten units, while the price of 12 USD was active in Store1 for twenty-three days, selling eight units. Thus, where the two sale points may not be comparable the date may be normalized by the number of days for which a price point was active.

The price journey algorithm disclosed herein provides a framework to: (1) track the price journey; (2) normalize sales by the duration of a price point (number of effective days); (3) adjust normalized sales volume for out of stock scenarios; and (4) track overlap of dates for a price point across multiple stores in a market. Data overlap across multiple stores in a single market are handled by the price journey algorithm. For example, the price point P1 for a product could be active in Store1, Store2, and Store3 in market M1 during the same time period. However, to calculate the net effect of how many days the price point P1 had on the total volume sold at the particular price in a single market, the overlap number of days are removed, and the distinct number of days are counted.

In one example, the price journey algorithm uses POS data to derive the following data, which is used to calculate the total number of days the particular price point was active. The overlap dates are discounted, and a distinct interval is computed for the price point. The derived data may include:
  the list of dates in which products are sold in a particular store at a particular price point;
  the interval between the consecutive dates the products are sold at the same price point; and
  the overlap of the intervals between different stores in same market when products are sold at same price point.

For a given product and market, the algorithm operates as follows in one example. The derived distinct number of days is used to normalize volume data for a product, thus allowing normalization of demand, allowing for accurate elasticity calculations. From a dataset built from each store containing each transaction ordered by the transaction date, an array of price point vectors is created. Each price point vector for a particular product contains the product's price point, the transaction date that price point was active, and the next transaction date where that particular product was part of a transaction (e.g., the lead date). Data on which particular entity is associated with which price point may not be considered in this example. Within the array, the vectors are grouped by price point, so that all the vectors with the same price point are contiguous and ordered by transaction date.

On iteration through each price point vector in the price point array, the following operations occur. A lead date is defined as the lead date stored in the current vector, a transaction date is defined as the transaction date stored in the current vector, and a previous covered date is defined as the lead date of the previous vector in the price point array. If the previous covered date for the vector precedes the currently known earliest previously covered date for that item at that price point (the maximum previous covered date), as determined from the vectors examined before the current vector, then the current previous recorded date is set as the new max previously covered date for that item at that price point. The number of days that price point has been active for that item is then calculated as the lead date less the maximum of the maximum previous covered date and the transaction date. If the number of days from this calculation is less than zero, then the number of days is set to zero. The calculated number of days is then appended to the price point vector. After this process has iterated through all the price point vectors in the price point array, the total number of days for each price point is calculated as the sum of the number of days of each price point vector having the same price point.

This algorithm is illustrated by the following example, as shown in the tables below.

Input: One Product in a Particular Market

| Store | Visit Date | Price Point of Product |
|---|---|---|
| Store1 | 1 Jan. 2016 | P1 |
| Store2 | 2 Jan. 2016 | P2 |
| Store3 | 3 Jan. 2016 | P1 |
| Store3 | 4 Jan. 2016 | P1 |
| Store1 | 5 Jan. 2016 | P3 |
| Store2 | 5 Jan. 2016 | P3 |

Price Point Array

| Price Point | Visit Date | Lead Date |
|---|---|---|
| P1 | 1 Jan. 2016 | 5 Jan. 2016 |
| P2 | 2 Jan. 2016 | 5 Jan. 2016 |
| P1 | 3 Jan. 2016 | 4 Jan. 2016 |
| P3 | 5 Jan. 2016 | 5 Jan. 2016 |
| P3 | 5 Jan. 2016 | 5 Jan. 2016 |

| Price Point | Visit Date | Lead Date | Prev Covered Date | Max Prev Covered Date |
|---|---|---|---|---|
| P1 | 1 Jan. 2016 | 5 Jan. 2016 | 1 Jan. 2016 | 1 Jan. 2016 |
| P2 | 2 Jan. 2016 | 5 Jan. 2016 | 1 Jan. 2016 | 1 Jan. 2016 |
| P1 | 3 Jan. 2016 | 4 Jan. 2016 | 5 Jan. 2016 | 5 Jan. 2016 |
| P3 | 5 Jan. 2016 | 5 Jan. 2016 | 1 Jan. 2016 | 1 Jan. 2016 |
| P3 | 5 Jan. 2016 | 5 Jan. 2016 | 5 Jan. 2016 | 5 Jan. 2016 |

| Price Point | Visit Date | Lead Date | Prev Covered Date | Max Prev Covered Date | Number of Days (Lead Date − Max (visit date, max prev covered date)) |
|---|---|---|---|---|---|
| P1 | 1 Jan. 2016 | 5 Jan. 2016 | 1 Jan. 2016 | 1 Jan. 2016 | 4 |
| P2 | 2 Jan. 2016 | 5 Jan. 2016 | 1 Jan. 2016 | 1 Jan. 2016 | 3 |
| P1 | 3 Jan. 2016 | 4 Jan. 2016 | 5 Jan. 2016 | 5 Jan. 2016 | −1 (0) |
| P3 | 5 Jan. 2016 | 5 Jan. 2016 | 1 Jan. 2016 | 1 Jan. 2016 | 1 |
| P3 | 5 Jan. 2016 | 5 Jan. 2016 | 5 Jan. 2016 | 5 Jan. 2016 | 0 |

Output:

| | |
|---|---|
| P1 | 1 Jan. 2016-4 Jan. 2016 = 4 days |
| P2 | 2 Jan. 2016-4 Jan. 2016 = 3 days |
| P3 | 5 Jan. 2016 = 1 day |

To adjust volume data (e.g., demand information) when inventory is not present the following technique is used prior to normalization. The adjusted volume is then used for further normalization to capture the demand of the product in the store.

Record the actual inventory in each store for each product;

If the product is not present in a store for a particular day, record the next day when the product came in stock and current day when the product went out of stock;

To adjust the volume sales for the out of stock days, the following operations are performed at a store level:

Volume_to_be_adjusted equals Volume of units sold on the previous day of sales of the product before it went out of stock;

Visit date equals Previous day of sales of the product before it went out of stock;

Out of stock days equals Day when product came back in stock minus Day when the product went out of stock;

Next visit date equals Next sale of the product after the product went out of stock;

Total days between two sales equals Next visit date minus Visit date;

Volume adjusted equals Volume_to_be_adjusted plus (Volume_to_be_adjusted) times Out of stock days divided by (Total days between two sales minus Out of stock days)

A lost sales opportunity reflects the scenario when even if the store has sufficient inventory the customers do not end up buying the same due to a host of reasons such as pricing, demand and others. The price journey framework automatically addresses or accounts for lost sales opportunities. The framework is built upon actual sales of items against inventory information, normalized by number of days. This ensures that actual sales of a product are calculated when the price of that product is set for a definite time period.

Aspects of the disclosure further enable increased user interaction performance and user efficiency via user interface interaction. Various combinations of different factors which impact price elasticity may be easily tested against historical data based on user interface interaction. Automatic alerts, notification, and/or recommendations are generated as new data is obtained, which also contributes to increased user efficiency and reduced error rates, as well as faster processing. In this manner, the operations and architecture described herein improve the functioning of a computing device, and use conventional computer elements in an unconventional way, in some examples.

Referring again to FIG. 1, an exemplary block diagram illustrates a computing device for item-specific value optimization. In the example of FIG. 1, the computing device 102 represents a system for data request processing and item-specific elasticity estimation for generating value optimization output for specific items. As used herein, items refer to products or resources that may be bought and sold, or otherwise part of a value transaction.

The computing device 102 represents any device executing instructions (e.g., as application programs, operating system functionality, or both) to implement the operations and functionality as described herein. The computing device 102 may include a mobile computing device or any other portable device. In some examples, the mobile computing device includes a mobile telephone, laptop, tablet, computing pad, netbook, gaming device, and/or portable media player. The computing device 102 may also include less portable devices such as desktop personal computers, kiosks, tabletop devices, industrial control devices, wireless charging stations, and electric automobile charging stations. Additionally, the computing device 102 may represent a group of processing units or other computing devices 102.

In some examples, the computing device 102 has at least one processor 104, a memory area 106, and at least one user interface. The processor 104 includes any quantity of processing units and is programmed to execute computer-executable instructions for implementing aspects of the disclosure. The instructions may be performed by the processor 104 or by multiple processors 104 within the computing device 102 or performed by a processor external to the computing device. In some examples, the processor 104 is programmed to execute instructions such as those illustrated in the figures (e.g., FIG. 3, FIG. 4, and FIG. 5).

In some examples, the processor 104 represents an implementation of analog techniques to perform the operations described herein. For example, the operations may be performed by an analog computing device and/or a digital computing device.

The computing device 102 further has one or more computer-readable media such as the memory area 106. The memory area 106 includes any quantity of media associated with or accessible by the computing device 102. The memory area 106 may be internal to the computing device 102 (as shown in FIG. 1), external to the computing device 102, or both. In some examples, the memory area 106 includes read-only memory and/or memory wired into an analog computing device.

The memory area 106 stores, among other data, one or more applications. The applications, when executed by the processor 104, operate to perform functionality on the computing device. Exemplary applications include an optimization environment 108, which may represent an application for item-specific processing of data requests for generating item-specific elasticity measures and item-specific value optimization outputs. The applications may communicate with counterpart applications or services such as web services accessible via a communication network 110. For example, the applications may represent downloaded client-side applications that correspond to server-side services executing in a cloud. The memory area 106 may store data sources 112, which may represent data stored locally at memory area 106, data access points stored locally at memory area 106 and associated with data stored remote from computing device 102, or any combination of local and remote data.

The memory area 106 further stores one or more computer-executable components. Exemplary components include a user interface component 114. The user interface component 114 which, when executed by the processor 104 of the computing device 102, causes the processor 104 to perform operations, including to receive user selections, such as data requests, during user interaction with the optimization environment 108, for example.

In some examples, the user interface component 114 includes a graphics card for displaying data to the user and receiving data from the user. The user interface component 114 may also include computer-executable instructions (e.g., a driver) for operating the graphics card. Further, the user interface component 114 may include a display (e.g., a touch screen display or natural user interface) and/or computer-executable instructions (e.g., a driver) for operating the display. The user interface component 114 may also include one or more of the following to provide data to the user or receive data from the user: speakers, a sound card, a camera, a microphone, a vibration motor, one or more accelerometers, a BLUETOOTH® brand communication module, global positioning system (GPS) hardware, and a photoreceptive light sensor. For example, the user may input commands or manipulate data by moving the computing device 102 in a particular way. In another example, the user may input commands or manipulate data by providing a gesture detectable by the user interface component 114, such as a touch or tap of a touch screen display or natural user interface.

In some examples, a user 116 may interact with the system of the computing device 102 via a communications network 110 using an interface 118. The interface 118 may be a user interface component of another computing device communicatively coupled to the communication network 110, for example. In some examples, the interface 118 may provide an instance of the optimization environment 108 for receiving user input and displaying content to the user 116, while value optimization, elasticity estimation, and impact estimation operations are performed on the backend at the computing device 102.

The optimization environment 108 provides components for item-specific data request processing associated with one or more entities to generate an item-specific value optimization output for the item at an item-entity level. In some examples, the optimization environment 108 includes an item-specific value optimization module 120, and an item-specific normalization module 122 communicatively coupled to the item-specific value optimization module 120. In other examples, the optimization environment 108 further includes an item-specific elasticity estimation module 124. In some other examples, the optimization environment 108 further includes an item-specific impact estimation component 126.

The item-specific value optimization module 120 is a component of the optimization environment 108 that receives data requests for items and obtains item-entity data corresponding to each of the items and one or more individual entities, which the item-specific value optimization module 120 uses to generate volume data. Item-entity data includes but is not limited to: entity (store) identifier, inventory data (out of stock or on-hand), and POS data (transaction dates, items sold, item values (price), quantity sold for each item at each price point on a given date). The item-specific value optimization module 120 uses the item-entity data to generate one or more entity-specific item value arrays for the item based on the obtained item-entity data. Item values are particular price points for an item at a given time. An individual entity-specific item value array corresponds to an individual entity, and the one or more entity-specific item value arrays include one or more item values associated with the item and one or more timestamps associated with the one or more item values. In some examples, the individual entity is a specific retail store location. Based on the generated one or more entity-specific item value arrays, the item-specific value optimization module 120 generates volume data associated with the item. The volume data includes a number of value-volume pairs (quantity of items sold at a particular item value), a number of volume-date pairs (quantity of items sold for each and every date), and a number of date-value pairs (item price points for each and every date).

After generating the volume data, the item-specific value optimization module 120 calculates individual durations for individual item values of the one or more item values based on the generated volume data. The individual durations for individual item values are the number of days derived for the item at each price point. These durations comprise the price journey for the item.

In some examples, the item-specific value optimization module 120 further calculates the individual durations for the individual item values including by: identifying one or more overlapping intervals of an individual item value between two or more individual entities; calculating one or more overlap durations for the identified one or more overlapping intervals; and filtering out the calculated one or more overlap durations as the calculated individual durations are computed for the individual item values.

In some examples, the item-specific value optimization module 120 refines the volume data based on inventory data for the item. In such examples, the item-specific value optimization module 120 further identifies the inventory data for the item at a per-individual entity basis using the obtained item-entity data and determines whether the inventory data for the item indicates an absent inventory status. In response to a determination that the absent inventory status is indicated for the item, the item-specific value optimization module 120 calculates a duration associated with the absent inventory status for the item based on the identified inventory data and adjusts the volume data associated with the item based on the calculated duration associated with the absent inventory status.

In some examples, the item-specific value optimization module 120 refines the volume data based on transaction data for the item. In such examples, the item-specific value optimization module 120 further: identifies the transaction data for the item at a per-individual entity basis using the obtained item-entity data and determines whether the transaction data for the item indicates an absent volume status for one or more dates. In response to a determination that the absent volume status is indicated for the item for the one or more dates, the item-specific value optimization module 120 calculates the individual item values for the item for individual dates of the one or more dates. In some examples, the calculation of the individual item values for the item for individual dates of the one or more dates further includes identifying a nearest previous date relative to the individual date, the nearest previous date having a corresponding item value for the item, and generating a date-value pair for the individual date using the corresponding item value of the identified nearest previous date. The item-specific value optimization module 120 adjusts the volume data associated with the item based on the calculated individual item values.

The item-specific normalization module 122 is a component of the optimization environment 108 that is communicatively coupled to the item-specific value optimization module 120, which identifies one or more entity-specific factors associated with the item-entity data, normalizes the generated volume data based on the one or more entity-specific factors and the calculated individual durations, and generates an item-specific value optimization output based on the normalized volume data. The generated item-specific value optimization output is a directional indicator, or an indication of a direction that an adjustment to the current value associated with the item should take in order to optimize the valuation for that item at the one or more individual entities. For example, a direction indicator may be an indication that the item price should increase, decrease, or be maintained for a given time period, in order to be an optimal or fair pricing for that item at the one or more individual entities.

Entity-specific factors may include entity format, entity size, entity region, volume of sales, entity location, or entity inventory, seasonal factors, regional factors, holidays, special events, markdown/clearance (data anomalies), natural disasters, weather, store closures, inventory issues, supply chain issues, or anything else that may be taken into account to normalize demand estimation.

Entity format may refer to a variable type of entity within a larger entity environment, such as a type of branded store within the branded environment. For example, a company may have variable formats or types of stores within the company of stores, such as a small neighborhood store format, a large megastore format, an urban format, a rural format, a domestic format, an international format, and so forth. The format of the entity may have an impact on the data related to an item sold or otherwise offered for sale at that specific entity.

Likewise, entity size may be another entity-specific factor that impacts the data related to an item associated with that specific entity. As used herein, entity size may refer to an available square footage of retail space for that entity location, rather than a format of the entity. Entity region may refer to the geo-physical location of a specific entity. As used herein, entity location may refer to a type of environment associated with the geo-physical location of a specific entity, such as, without limitation, rural environment, urban environment, residential environment, coastal environment, land-locked environment, and the like.

Entity inventory refers to information on other items, products, or services provided by or offered at the specific entity, which may impact data related to the specific item that is the subject of the data request. These entity-specific factors are identified by the item-specific normalization module 122 for each of the individual entities associated with the item identified by the data request, and used to normalize the item-entity data, for example, by taking into account where a store is located, what size or type of store it is, and normalizing sales data related to the item based on that information. In other words, normalizing the item-entity data is not directed at modifying the structure of the data, but rather adjusting values of the data using variable weights of the various entity-specific factors.

The normalized volume data for the item as described above represents the item-specific price journey for that item, to accurately calculate item elasticity.

In some examples, the item-specific elasticity estimation module 124 is a component of the optimization environment 108 that is communicatively coupled to the item-specific normalization module 122. The item-specific elasticity estimation module 124 obtains the item-entity data and the generated item-specific value optimization output, identifies a value response curve for the item using the obtained item-entity data and the generated item-specific value optimization output, and generates an item-specific elasticity measure for the item. In some examples, the item-specific elasticity estimation module 124 further comprises a lost sale component 125. The lost sale component 125 is configured to provide an indication to the item-specific elasticity estimation module 124 as to whether a lost sale factor applies to the item associated with the individual entity for a given time period. In such examples, the determined elasticity measure for the item is calculated at least in part using the lost sale factor.

A lost sale factor may include information associated with the item and the individual entity relative to a loss, such as identifying whether a product was available or unavailable at a product placement location within the entity at a time that a customer was looking for the item, for example. Other lost sale information may include statistical calculations based on sales of similar items at the same entity, or sales of the same or similar items at similar entities, a determination of a normal rate of sale for an item calculated with an actual rate of sale, information on a loss of demand, shelf gap data (inventory on hand but not accessible by the consumer), and so forth.

In some examples, the item-specific impact estimation component 126 is a component of the optimization environment 108 that is communicatively coupled to the item-specific normalization module 122. The item-specific impact estimation component 126 obtains the item-entity data, the normalized volume data, and competitor data, calculates item affinity and item substitutability data for the item, and integrates the obtained item-entity data, the normalized volume data, and the competitor data with the calculated item affinity and item substitutability data to generate integrated item data. The item-specific impact estimation component 126 applies outlier treatment to the integrated item data and processes the integrated item data using a number of machine learning models.

Figure 6:
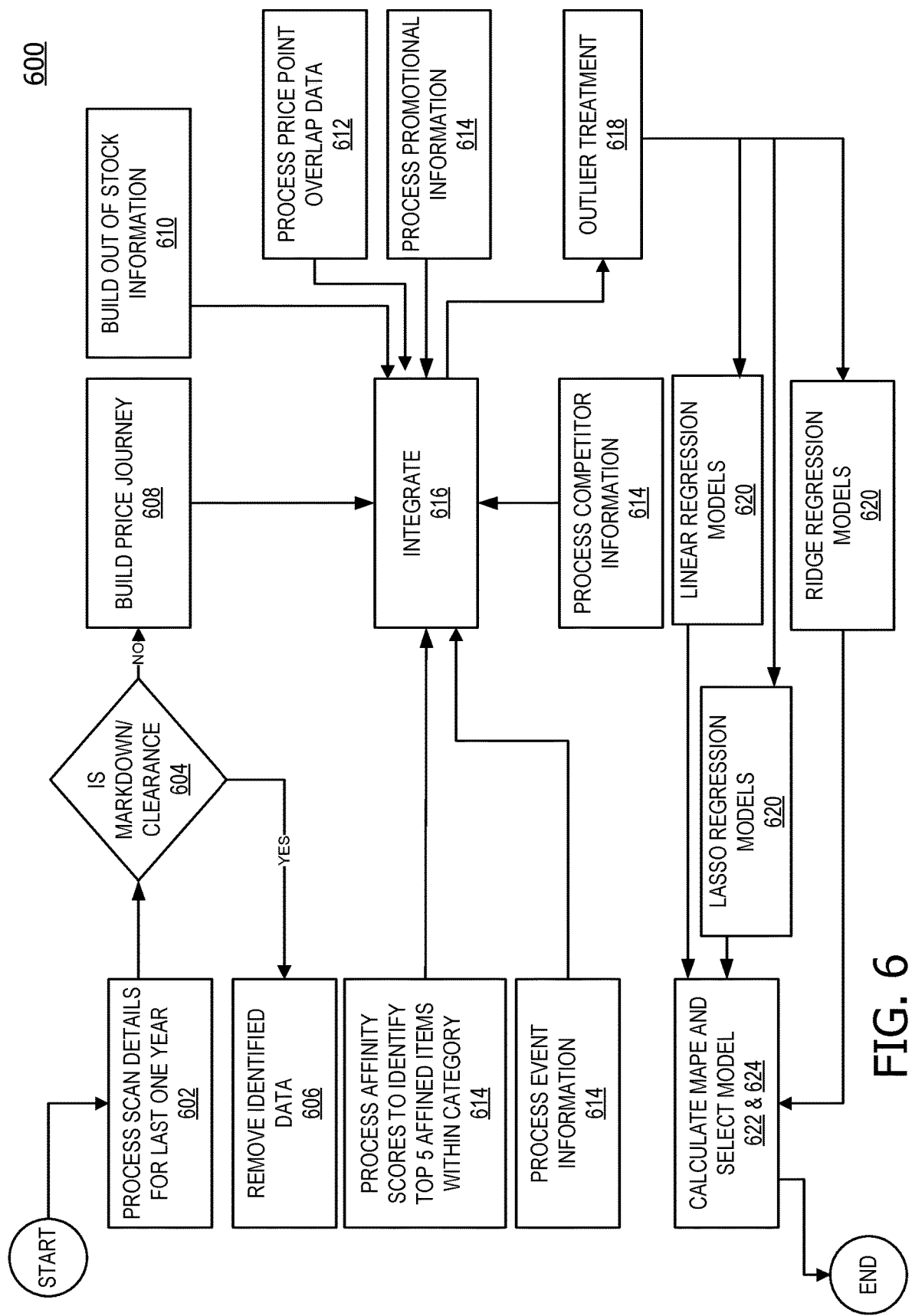
FIG. 6 is an exemplary flow diagram illustrating operation of a price impact estimation algorithm as part of item-specific value optimization calculations.

Item affinity and item substitutability data, as well as competitor data, are explored in-depth herein under the portion of the disclosure discussing FIG. 6. Outlier treatment includes, but is not limited to, determining whether a price for an item has been effective in a minimum number of stores sufficient to determine whether the price reflects a large enough sample of stores that it is not a local or regional anomaly that will skew the calculations. If not, those prices are considered outliers and discarded from further calculations. For example, if an item price is not active in at least fifty stores, it may be discarded as an outlier.

The item-specific impact estimation component 126 further calculates individual mean absolute percentage errors for the processed integrated item data for each of the number of machine learning models and selects a model based on the calculated individual mean absolute percentage errors. The item-specific impact estimation module 126 calculates an item-specific elasticity value for the item based on the selected model. This process is explored in further detail in the portion of the disclosure related to FIG. 6.

Referring again to FIG. 2, an exemplary block diagram illustrates an optimization environment 200 for generating an item-specific value optimization output 250. The optimization environment 200 is an illustrative example of one implementation of the optimization environment 108 in FIG.

Figure 2:
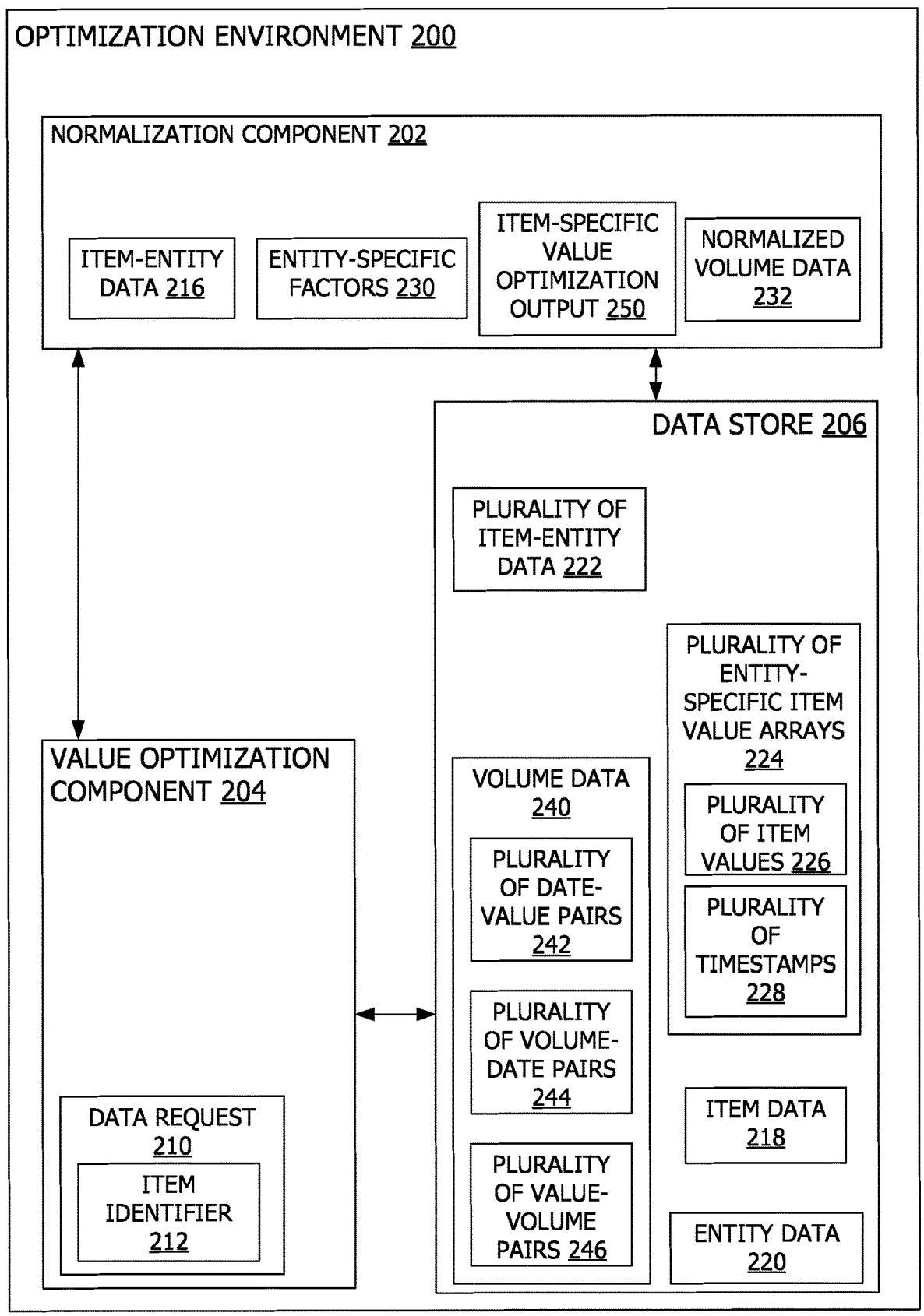
FIG. 2 is an exemplary block diagram illustrating an optimization environment for generating an item-specific value optimization output.

1. In the example of FIG. 2, the optimization environment 200 includes a value optimization component 204, a normalization component 202, and a data store 206.

The value optimization component 204 may receive a data request 210 for an item, which includes an item identifier 212. The item identifier 212 may be a unique identifier of an item, product, or service, such as an item name or item number, for example. The item identifier 212 may also be, for example, a UPC code which is used to treat a group of items as a single item for tracking purposes. The value optimization component 204 may obtain item-entity data 216 corresponding to the item and one or more individual entities. The value optimization component 204 may generate one or more entity-specific item value arrays for the item based on the obtained item-entity data 216. An individual entity-specific item value array corresponds to an individual entity. Each of the generated one or more entity-specific item value arrays include one or more item values associated with the item and one or more timestamps associated with the one or more item values.

The value optimization component 204 may generate volume data 240 associated with the item based on the generated one or more entity-specific item value arrays. The volume data 240 includes a number of value-volume pairs 246, a number of volume-date pairs 244, and a number of date-value pairs 242. The value optimization component 204 may calculate individual durations for individual item values of the one or more item values based on the generated volume data 240. In some examples, calculating the individual durations for the individual item values further comprises: identifying one or more overlapping intervals of an individual item value between two or more individual entities; calculating one or more overlap durations for the identified one or more overlapping intervals; and filtering out the calculated overlap durations as the calculated individual durations are computed for the individual item values.

In some examples, the value optimization component 204 may identify inventory data for the item at a per-individual entity basis using the obtained item-entity data 216 and determine whether the inventory data for the item indicates an absent inventory status. In response to a determination that the absent inventory status is indicated for the item, the value optimization component 204 calculates a duration associated with the absent inventory status for the item based on the identified inventory data. The value optimization component 204 may adjust the volume data 240 associated with the item based on the calculated duration associated with the absent inventory status.

In some examples, the value optimization component 204 may identify transaction data for the item at a per-individual entity basis using the obtained item-entity data and determine whether the transaction data for the item indicates an absent volume status for one or more dates. In response to a determination that the absent volume status is indicated for the item for the one or more dates, the value optimization component 204 may calculate the individual item values for the item for individual dates of the one or more dates and adjust the volume data 240 associated with the item based on the calculated individual item values. In some such examples, calculating the individual item values for the item for the individual date of the one or more dates further comprises: identifying a nearest previous date relative to the individual date, the nearest previous date having a corresponding item value for the item; and generating a date-value pair for the individual date using the corresponding item value of the identified nearest previous date.

The normalization component 202, communicatively coupled to the value optimization component 204, may identify one or more entity-specific factors 230 associated with the item-entity data 216 and normalize the generated volume data based on one or more entity-specific factors 230 and the calculated individual durations. The normalization component 202 may generate the item-specific value optimization output 250 based on normalized volume data 232.

The data store 206 may be implemented within the optimization environment 200, as depicted in the illustrative example of FIG. 2, or alternatively may be located remote from and communicatively coupled to optimization environment 200 (not shown). The value optimization component 204 and the normalization component 202 may access the data store 206 to obtain information relative to the data request 210, such as item-entity data 216.

The data store 206 may include, without limitation, item data 218, entity data 220, a plurality of item-entity data 222, and a plurality of entity-specific item value arrays 224. Each of the individual entity-specific item value arrays may include a plurality of item values 226 and the plurality of timestamps 228. Item data 218 may include information on individual items, such as attributes of the individual items, historical data associated with the individual items, and the like. Entity data 220 may include information on individual entities, such as attributes of the individual entities, historical data associated with the individual entities, and the like. The plurality of item-entity data 222 may include information associated with individual items relative to one or more individual entities. The plurality of item-entity data 222 includes but is not limited to: entity (e.g., store) identifier, inventory data (e.g., out of stock or on-hand), and POS data (e.g., transaction dates, items sold, item values (e.g., price), quantity sold for each item at each price point on a given date).

In some examples, when the value optimization component 204 receives the data request 210, the value optimization component 204 may use the item identifier 212 to determine whether the item-entity data 216 for the specific item and the one or more individual entities is already stored in the plurality of item-entity data 222, and if so, retrieve the relevant item-entity data 216 for the data request 212. If the stored item-entity data 216 is not available from the plurality of item-entity data 222 for the specific item and the one or more individual entities, the value optimization component 204 may locate relevant information for the specific item and the one or more individual entities from the item data 218 and the entity data 220, process the relevant information into the item-entity data 216, and optionally store the item-entity data 216 at the plurality of item-entity data 222 for future use.

Figure 3:
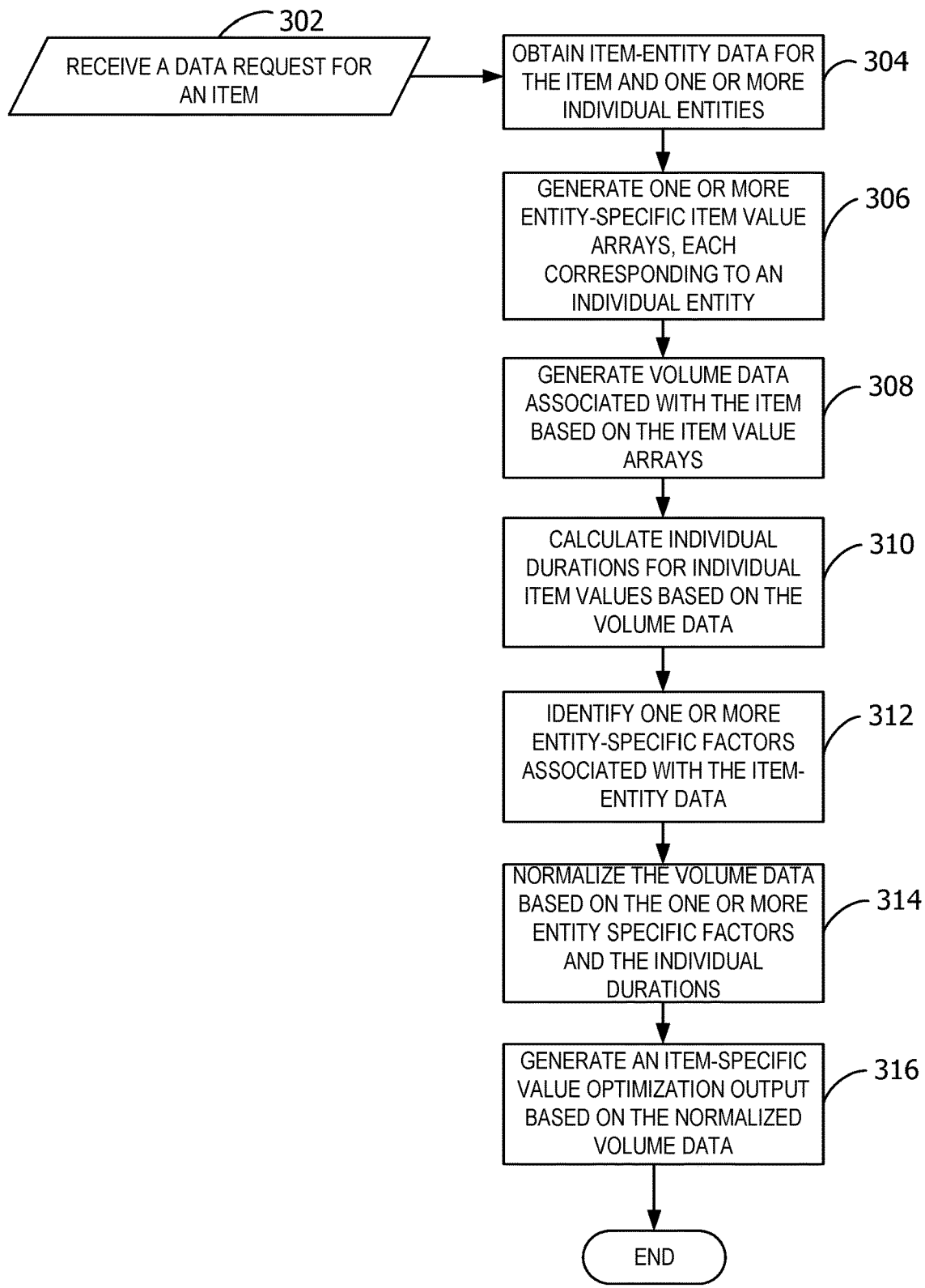
FIG. 3 is an exemplary flow chart illustrating operation of the computing device to generate a value optimization output based on normalized volume data for an individual item relative to one or more individual entities.

FIG. 3 is an exemplary flow chart illustrating operation of the computing device to generate a value optimization output based on normalized volume data for an individual item relative to one or more individual entities. The exemplary operations presented in FIG. 3 may be performed by one or more components described in FIG. 1 or FIG. 2, for example.

The process receives a data request for an item at operation 302. The data request is received by a value optimization component of an optimization environment, for example. The data request may include an item identifier. The process obtains item-entity data corresponding to the item and one or more individual entities at operation 304. The data obtained may be specific both to the item and the one or more individual entities, and further may be specific to a given time period, in some examples.

The process generates one or more entity-specific item value arrays for the item based on the obtained item-entity data at operation 306. An individual entity-specific item value array corresponds to an individual entity. The one or more entity-specific item value arrays each include one or more item values associated with the item and one or more timestamps associated with the one or more item values.

The process generates volume data associated with the item based on the generated one or more entity-specific item value arrays at operation 308. The volume data includes a number of value-volume pairs, a number of volume-date pairs, and a number of date-value pairs. The process calculates individual durations for individual item values of the one or more item values based on the generated volume data at operation 310. The process identifies one or more entity-specific factors associated with the item-entity data at operation 312. The identification is performed by a normalization component of an optimization environment. The process normalizes the generated volume data based on the one or more entity-specific factors and the calculated individual durations at operation 314. The process generates an item-specific value optimization output based on the normalized volume data at operation 316. The process terminates thereafter.

Figure 4:
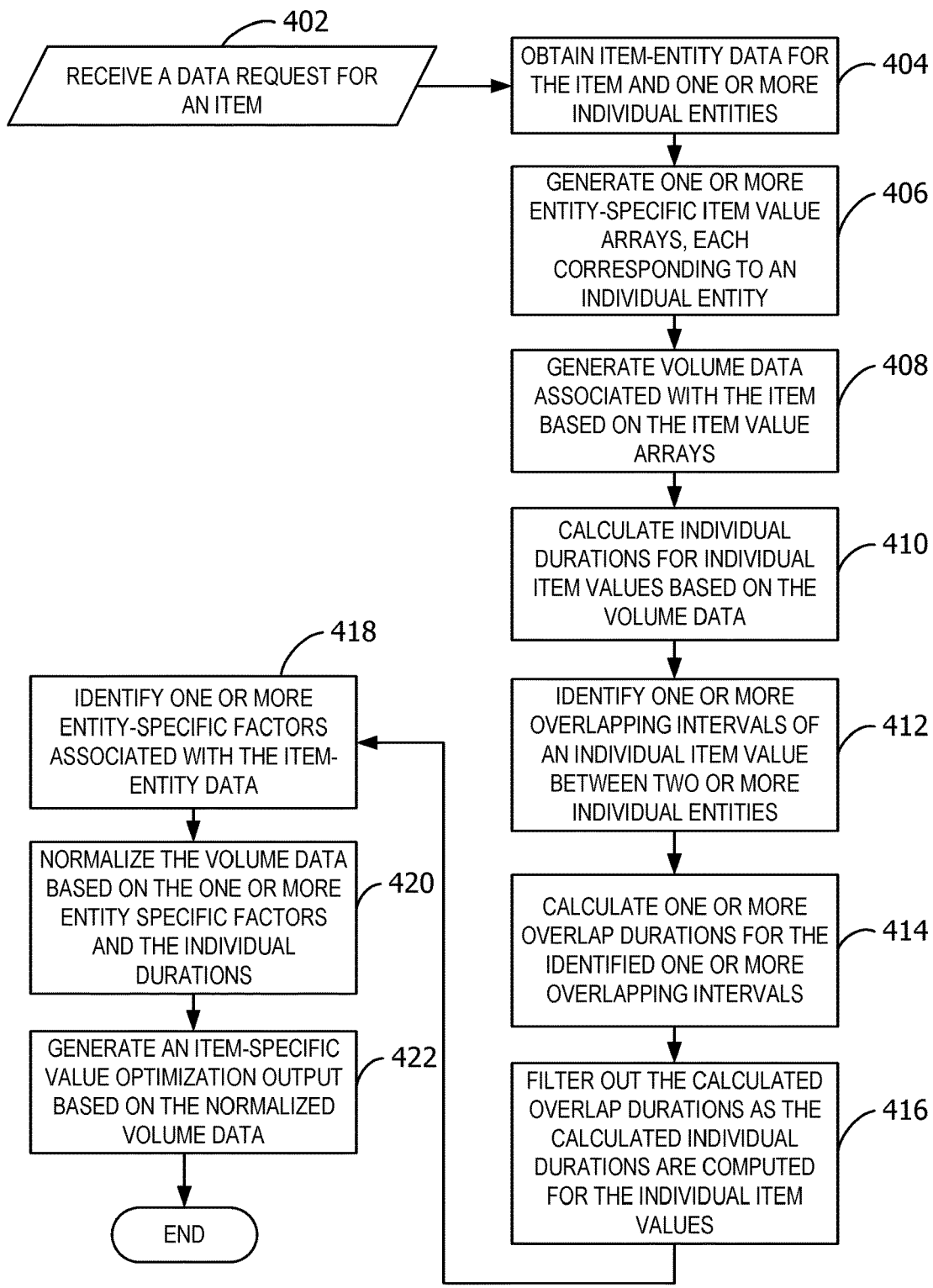
FIG. 4 is an exemplary flow chart illustrating operation of the computing device to generate a value optimization output based on normalized volume data for an individual item relative to one or more individual entities, with overlap durations of individual item values between two or more individual entities filtered out.

FIG. 4 is an exemplary flow chart illustrating operation of the computing device to generate a value optimization output based on normalized volume data for an individual item relative to one or more individual entities, with overlap durations of individual item values between two or more individual entities filtered out. The exemplary operations presented in FIG. 4 may be performed by one or more components described in FIG. 1 or FIG. 2, for example.

The process receives the data request for the item at operation 402. The data request is received by the value optimization component of the optimization environment, for example. The data request may include an item identifier. The process obtains the item-entity data corresponding to the item and one or more individual entities at operation 404. The data obtained may be specific both to the item and the one or more individual entities, and further may be specific to a given time period, in some examples.

The process generates the one or more entity-specific item value arrays for the item based on the obtained item-entity data at operation 406. Each of the individual entity-specific item value arrays correspond to each of the individual entities. The one or more entity-specific item value arrays each include the one or more item values associated with the item and the one or more timestamps associated with the one or more item values.

The process generates the volume data associated with the item based on the generated one or more entity-specific item value arrays at operation 408. The volume data includes a number of the value-volume pairs, a number of the volume-date pairs, and a number of the date-value pairs.

The process calculates the individual durations for the individual item values of the one or more item values based on the generated volume data at operation 410. The process identifies one or more overlapping intervals of an individual item value between two or more individual entities at operation 412. The process calculates one or more overlap durations for the identified one or more overlapping intervals at operation 414. The process filters out the calculated overlap durations as the calculated individual durations are computed for the individual item values at operation 416.

The process identifies one or more entity-specific factors associated with the item-entity data at operation 418. The identification is performed by a normalization component of an optimization environment. The process normalizes the generated volume data based on the one or more entity-specific factors and the calculated individual durations at operation 420. The process generates an item-specific value optimization output based on the normalized volume data at operation 422. The process terminates thereafter.

In some examples, the processes illustrated by FIG. 3 and FIG. 4 each further perform the following actions to refine the volume data based on item inventory, prior to normalization of the volume data:

Each of the processes identify inventory data for the item at a per-individual entity basis using the obtained item-entity data.

Each of the processes determine whether the inventory data for the item indicates an absent inventory status.

In response to a determination that the absent inventory status is indicated for the item, each of the processes calculate a duration associated with the absent inventory status for the item based on the identified inventory data.

Each of the processes adjust the volume data associated with the item based on the calculated individual item values. Each of the processes continues as indicated in FIG. 3 or FIG. 4 thereafter.

In some examples, the processes illustrated by FIG. 3 and FIG. 4 each further perform the following actions to refine the volume data based on item transaction history, prior to normalization of the volume data.

Each of the processes identifies transaction data for the item at a per-individual entity basis using the obtained item-entity data.

Each of the processes determines whether the transaction data for the item indicates an absent volume status for one or more dates.

In response to a determination that the absent volume status is indicated for the item for the one or more dates, each of the processes calculates the individual item values for the item for individual dates of the one or more dates.

Each of the processes adjusts the volume data associated with the item based on the calculated individual item values.

In some examples of each of the processes, calculating the individual item values for the item for individual dates of the one or more dates further comprises: each of the processes identifying a nearest previous date relative to the individual date, the nearest previous date having a corresponding item value for the item; and each of the processes generating a date-value pair for the individual date using the corresponding item value of the identified nearest previous date.

Figure 5:
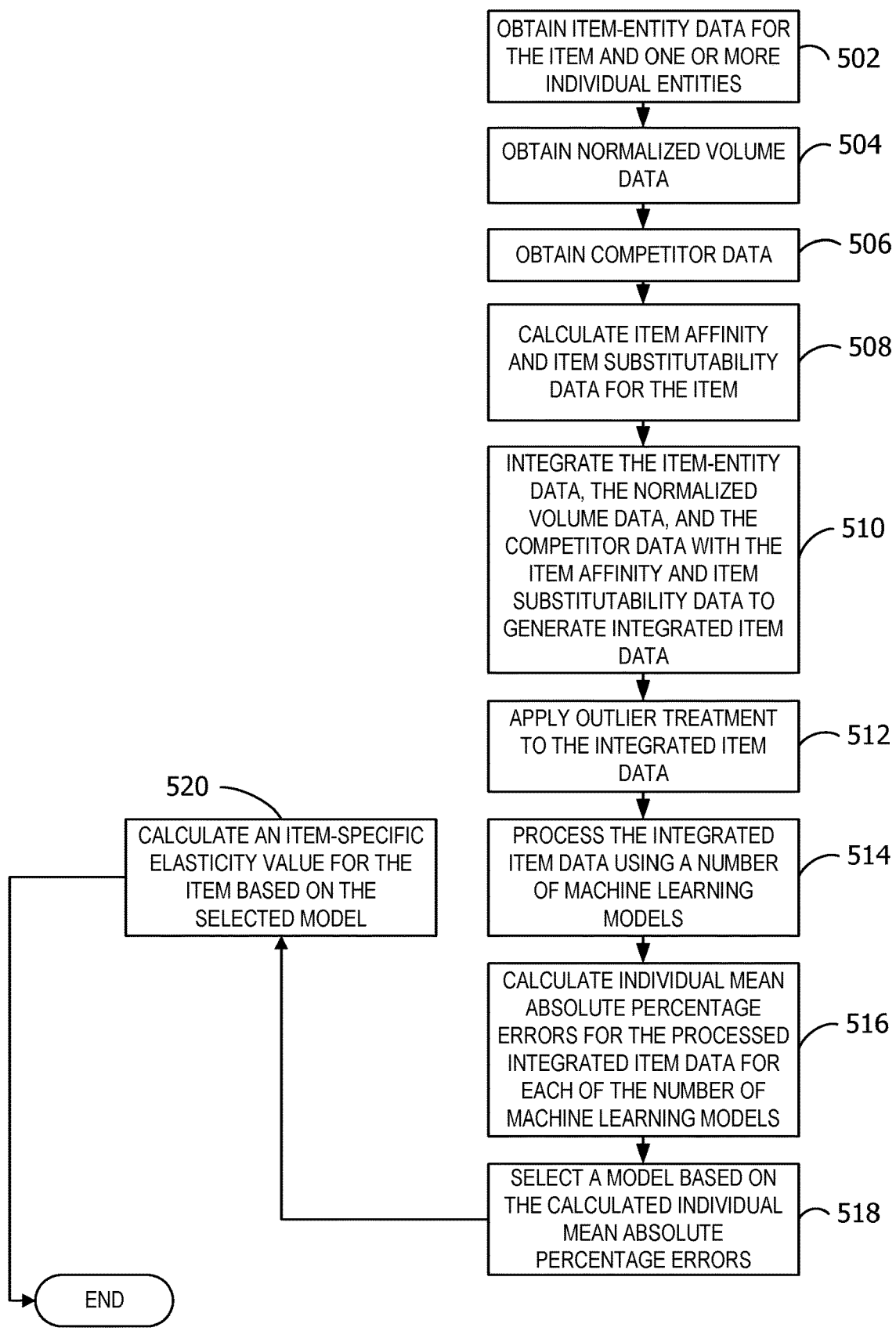
FIG. 5 is an exemplary flow chart illustrating operation of the computing device to generate an item-specific elasticity value for the item based on a selected machine learning model.

FIG. 5 is an exemplary flow chart illustrating operation of the computing device to generate an item-specific elasticity value for the item based on a selected machine learning model. The exemplary operations presented in FIG. 5 may be performed after and in addition to performing the operations presented in FIG. 3 and or FIG. 4. The exemplary operations presented in FIG. 5 may be performed by one or more components described in FIG. 1, for example.

The process obtains the item-entity data at operation 502 and the normalized volume data at operation 504. The item-entity data is obtained by an impact estimation component, for example. The data obtained may be specific both to the item and the one or more individual entities, and further may be specific to a given time period, in some examples.

The process obtains competitor data at operation 506. The process calculates item affinity and item substitutability data for the item at operation 508. The process integrates the obtained item-entity data, the normalized volume data, and the competitor data with the calculated item affinity and item substitutability data to generate integrated item data at operation 510. The process applies outlier treatment to the integrated item data at operation 512. The process processes the integrated item data using a number of machine learning models at operation 514.

The process calculates individual mean absolute percentage errors for the processed integrated item data for each of the number of machine learning models at operation 516. The process selects a model based on the calculated individual mean absolute percentage errors at operation 518. The process calculates an item-specific elasticity value for the item based on the selected model at operation 520. The process terminates thereafter.

FIG. 6 is an exemplary flow diagram illustrating operation of a price impact estimation process 600 as part of item-specific value optimization calculations. FIG. 6 may be an illustrative example of one implementation of the exemplary operations presented in FIG. 5 and or the optimization environment 108 of FIG. 1, for example.

As depicted in this illustrative data flow, POS (e.g., scan) data which includes visit date, retail price, unit cost, and corresponding volume quantity at the individual transaction level is taken as an input at step 602. In some examples, this data will cover a one-year time period. In other examples, this data may cover other time periods or ranges of time.

The process first removes data anomalies (e.g. sales during markdown and clearance events), because when a retail store sells an item in markdown and/or clearance, it reduces the price heavily and those reduced price points may create misleading price variation in the data. Also, the response as measured in sales against such price variance may not represent real-world response. This work is done at steps 604 and 606.

The process then tracks the price journey for an item at step 608. The algorithm for tracking the price journey is discussed elsewhere herein. Sales are considered against a particular price point, and price movements across stores are tracked and the volume normalized by the number of days the price was active in the stores.

Once the price journey for an item is built, out of stock adjustment occurs at step 610. This adjustment identifies the dates when an item was out of stock in a particular store which resulted in lost sales opportunities. For example, one exemplary reason sales might not have happened is because of lack of inventory to fulfill the customer demand, rather than any pricing decision. The volume loss because of out of stock status may be excluded so as to understand the true demand against a particular price point.

Once the out of stock adjustment is completed, the process identifies the overlap of price points for an item at step 612. The objective is to find the volume sales per store per unit time (e.g.: per week) expressed in terms of price and other contributing factors. Thus, if the same price is effective across multiple stores in the same timeline, the sales volume data for the particular price point may be adjusted based on number of days and count of stores in which it was valid.

Once this adjustment is complete, the process next includes information for all additional inputs at step 614, which include but are not limited to: event data (e.g.: sports, weather, and calendar events); competitor data (e.g.: competitor price, price gap, and market share); affinity data (e.g.: complementary items); substitute data (e.g.: substitute items); and promotion data (e.g.: rollbacks and other promotions).

Event data is segregated as calendar, local and weather events. Calendar events are those which will have impact on all the stores (e.g.: federal holidays, holidays when time is traditionally given off work, annual national sales, religious festivals, etc.). Local events (e.g., professional or college football) will have impact only on few stores. Weather events may only focus on those events which might impact customer visits to the stores (e.g., the amount of snowfall). For each event, an event index can be calculated as follows: (number of days*number of stores where event was valid)/(total number of stores).

To understand the transfer impact of changing an item's price, an equal number of highly affined and highly substitute items are selected for the item. Affined items are items whose sales go hand in hand, where the price of one item has a direct impact on the price and/or sales of another item. Value adjustments to affined items may result in either a halo or cannibalization effect. For example, if the price adjustment of one item increases volume of sales of an affined item, the price adjustment has a halo effect. Where the price adjustment of one item decreases volume of sales of an affined item, the price adjustment has a cannibalization effect, for example. With regard to substitute items, sales of substitute items may reduce if the price of an item for which they are a substitute is reduced. This impact is classified as negative transfer impact. Affined items are selected based on a calculated affinity index and substitute items are selected based a calculated substitutability index and customer profiling of the parent item and substitutes. Performing these calculations utilizes pricing data for various affined and substitute items.

Once all the above information is integrated for an item for a given period of time (e.g.: a week) at step 616, certain outlier treatment steps are implemented upon the integrated item data at step 618, including but not limited to, checking if a price for an item has been effective in a minimum number of stores. If not, those prices are considered outliers and discarded from further calculations.

After outlier treatment is completed, the process derives a volume equation which is dependent on all the factors discussed above. Various versions of the equation are derived using regression modeling. At times, the coefficients of the several contributing factors are inflated. This inflation is removed from the equation by applying advanced machine learning techniques, including but not limited to industry standard lasso regression models, linear regression models, and linear regression models at step 620. These models include log linear models wherein the log of a volume is regressed against the log of a price along with other factors. The individual mean absolute percentage error is calculated for each model at step 622. Based on this calculation the model with the lowest individual mean absolute percentage error is chosen at step 624. The mean absolute percentage error is a measure of prediction accuracy of a forecasting method and is usually expressed as an accuracy percentage. The volume equation associated with this model can then be used to derive an item-specific elasticity value for the item which accounts for the various impact factors.

Considering the foregoing, many other factors contribute to explaining volume change other than just item price. The disclosure's approach to a price impact estimation process which accounts for these many factors may be summarized as follows:

Data Gathering: Datasets are prepared after gathering all sales information, event information, promotional information and competitor price information;

Price Journey: Price movements of items are traced across multiple stores and the duration of price points in different stores is identified;

Transfer Impact Information: Top substitutes and top complements for every item are identified, and sales information, competitor information, and transfer impact information are integrated;

Outlier Treatment: Price points for specific items active in, for example, less than 50 stores are removed, and items with, for example, sales on only two-hundred days out of the last two years are removed;

Model Preparation: A model is prepared to regress unit sales with several factors as identified using complex machine learning techniques and an equation derived to calculate unit sales; and Interactive Tool: An interactive tool allows a user to employ this process to explore the impact of a hypothetical price change on sales of an item The entire price estimation process may be divided into the following stages: (1) data preparation, (2) feature engineering, (3) modeling, (4) impact calculations (self-impact, halo, and cannibalization), and (5) data visualization. The following paragraphs explore each of these steps in detail.

Data preparation is a component of the process, which processes the raw data and runs the price journey algorithm to trace price movements of an item at a store level. Other data (for example, inventory, event, and or other data as applicable) may be processed at a daily level, and all the data (including the scan details and the data related to the other factors) may be integrated at a daily level, to build a single version of the truth at a daily level. Individual scan data may be processed at an individual transaction level to determine retail pricing (total dollar sales per transaction/units sold). The volume sold at that retail price at each individual store may be recorded at a daily level. This allows for tracing the movement of the retail price of an individual item at individual stores. Data preparation may only retain data for items which are active, as defined by sales frequency. For example, items sold at least once over the last ninety days may be considered active. In another example, an item which has not sold in a predetermined time range (i.e. 730 days for example) may be removed from consideration. Other periods of time may be used in this processing as desired. To avoid outlier price points (price point changes that are very store/region specific), which may skew the results for a price change impact estimation for a particular item, when considering a proposed price point for an item the proposed price point may need to be active in a minimum number of stores (i.e. at least fifty stores, for example).

Data preparation may also remove transactions when the transaction data indicates the retail price for an item was based on clearance or markdown status. Other promotional codes may also be recorded in the transaction data and considered by the price impact estimation process as appropriate. The process may determine applicable calendar events by web scraping. This may be done for a number of years in advance.

An assortment-based discipline is used to identify item substitutes, and the price impact estimation process processes and stores validated substitution scores. The process may be executed every six months, or according to some other frequency. Complement items are identified using affinity scores. An appropriate methodology is used to calculate such scores, which may be stored for later use. Using the affinity indices based on these affinity scores, a top complement for an item may be identified. Similarly using the substitution scores, a top substitute for an item may be identified.

In the feature engineering stage of the process, the scan data prepared in the above data preparation stage may be used as an input to the price journey algorithm to output item price point and volume data at a daily, per store level. Report codes in the transaction data may be used to create a promotion indicator for each transaction. Using the calendar data, a date indicator (for example, tracking month-and-day) and a time trend variable may be created. A national events indicator may also be created using the calendar data. The price of the topmost substitute and the price of the topmost compliment for an item, based on the affinity indices and the substitution scores, respectively, may be used to identify a causal relationship between volume sales of a parent item and the price of substitute and/or compliment items.

In the modelling stage, once the data has been prepared as detailed above, the data may be used for complex modelling involving machine learning techniques (for example, including but not limited to ridge regression). As detailed above, sales volume of an item may be regressed against a self-price and other factors. The underlying data may be divided into two parts, the training dataset and the test dataset. The training dataset then may contain data from two-years-and-three-months prior to the date of execution of the process up to three months prior to the date of execution of the process. The test data set may then contain data from three months prior to the date of execution of the process to the date of execution of the process. The models may be built using the training dataset, and then tested using the test data set. A final model may be selected on the basis of the lowest mean absolute percentage error. A model which has an elasticity coefficient in the range of [−4,0), a halo coefficient in the range of [−1,0) a substitute coefficient in the range of (0,1] and a mean absolute percentage error less than or equal to 30 may be selected, in some examples.

The impact calculations stage may be divided in to three parts, the self-impact calculation, the halo calculation, and the cannibalization calculation. The self-impact calculation may implement log linear models wherein the log of an item volume is regressed against the log of the item price, along with other factors. Using the regression equation, the volume equation may be derived as below:

$$V = (\text{Price})^{(Elasticity)} * e^{(Intercept + B1*(promotion\_indicator) + B2*Mon\_indicator + \ldots + B8*Sun\_indicator + B9*Jan\_indicator + \ldots + B20*Dec\_indicator + B21*year\_indicator + B22*weekend\_indicator \ldots + B23*Event\_1(Mother's\_day) + \ldots + B37*Event\_15(Cyber\_Monday))} * (\text{Halo Price})^{(Beta\ Halo)} * (\text{Sub price})^{(Beta\ Sub)}$$

where:

"Price" is the self-price of the item;

"Elasticity" is the beta coefficient of the price factor in the regression;

"B1" through "BN" are the beta coefficients of all the other factors;

and

"V" is the volume per store of the item

The halo volume of an affined item in the price impact estimation process is defined as the incremental volume of that item when a price change is made to the corresponding parent item. To calculate the halo volume:

a price change is identified for a given parent item;

all those items are identified for which the considered parent item is identified as an affined item; and the regression equation for the above-mentioned items is used to calculate the incremental halo volume obtained due to the price change in the parent item.

The cannibalization volume of a substitute item in the price impact estimation process is defined as the fall in volume of that item when a price change is made to the corresponding parent item. To calculate the cannibalization volume:

a price change is identified for a given parent item;

all those items are identified for which the considered parent item is identified as a substitute item; and the regression for the above-mentioned items is used to calculate the cannibalization volume obtained due to price change in the parent item.

In the data visualization stage of the process, these calculations may be used to derive the impact of a proposed price change on the sales volume of an item via user interaction with an interactive tool. Price may be a variable factor input from the interactive tool, and the remaining component may be fixed for a date, and hence the values may be pre-calculated and provided to the interactive tool. The same equation may be used to calculate and or forecast item sales volumes for future weeks. The same equation may be populated in a price impact monitoring tool and then may be used to monitor the consistency of models on a weekly basis.

Figure 7:
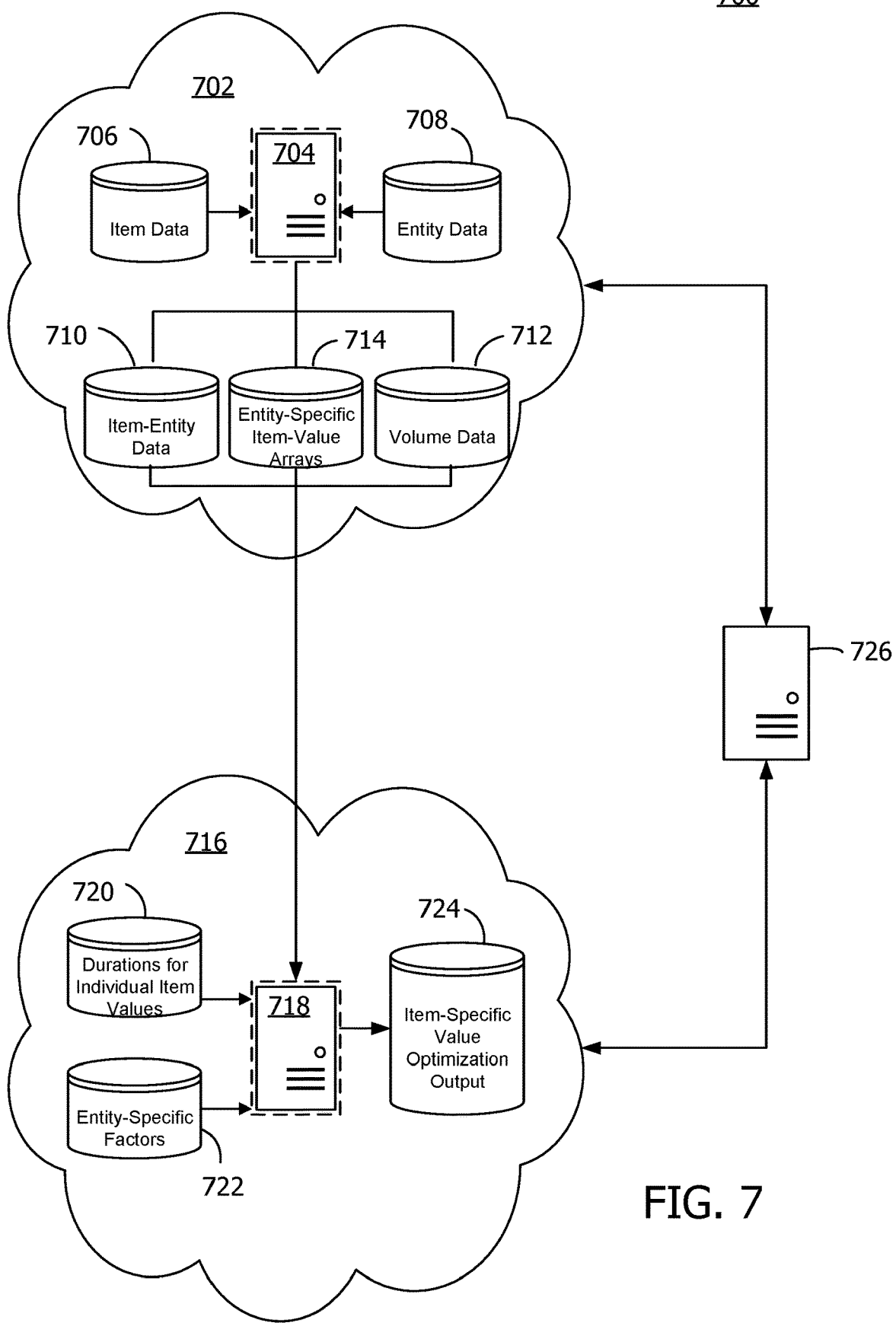
FIG. 7 is an exemplary diagram illustrating an optimization environment operating as a cloud-based service.

FIG. 7 is an exemplary diagram illustrating an optimization environment 700 operating as a cloud-based service. The optimization environment 700 may be an illustrative example of the optimization environment 108 in FIG. 1 and or the optimization environment 200 in FIG. 2.

The optimization environment 700 may be implemented in a cloud-based environment, with one or more operations performed in the cloud, for example. In this illustrative example, a cloud location 702 may include a virtual server 704, which may process item data 706 and entity data 708 to generate item-entity data 710, volume data 712, and entity-specific item value arrays 714.

A cloud location 716 may be communicatively coupled to cloud location 702, via a communication network, or other network, to receive and/or obtain the item data 706, the entity data 708, the item-entity data 710, the volume data 712, and the entity-specific item value arrays 714. A virtual server 718 may provide additional data including but not limited to durations for individual item values 720 and entity-specific factors 722. The virtual server 718 may also perform optimization operations, such as those depicted in FIG. 3, FIG. 4, and FIG. 5, for example, to process the data pertaining to an individual item and one or more individual entities, to generate an item-specific value optimization output 724, which may be output to a client-side value optimization system residing on a client-side server, such as a server 726 in this illustrative example.

Additional Examples

In some examples, elasticity is used to determine what a fair value or price may be for a specific item at one or more specific locations, not towards what a value amount should be set at, but rather if a value adjustment should be made to increase or decrease a current value or price associated with an item at a group of one or more entities, or if a current value should be maintained at those one or more entities for a given time period. In some instances, an increase in value of an item at one or more locations location may result in higher sales than a decrease in value at another one or more locations, based on various entity-specific factors, such as inflation, region, and so on, which is why normalizing the data for item-entity specific elasticity calculations leads to an item-specific value recommendation for the one or more specific entities, and an item-market level. This provides a highly customized valuation optimization and elasticity estimation for an individual item across a given market, that a company of stores may use to variably adjust valuations of items across different markets in order to maximize fair valuations across the company.

Exemplary Operating Environment

Figure 8:
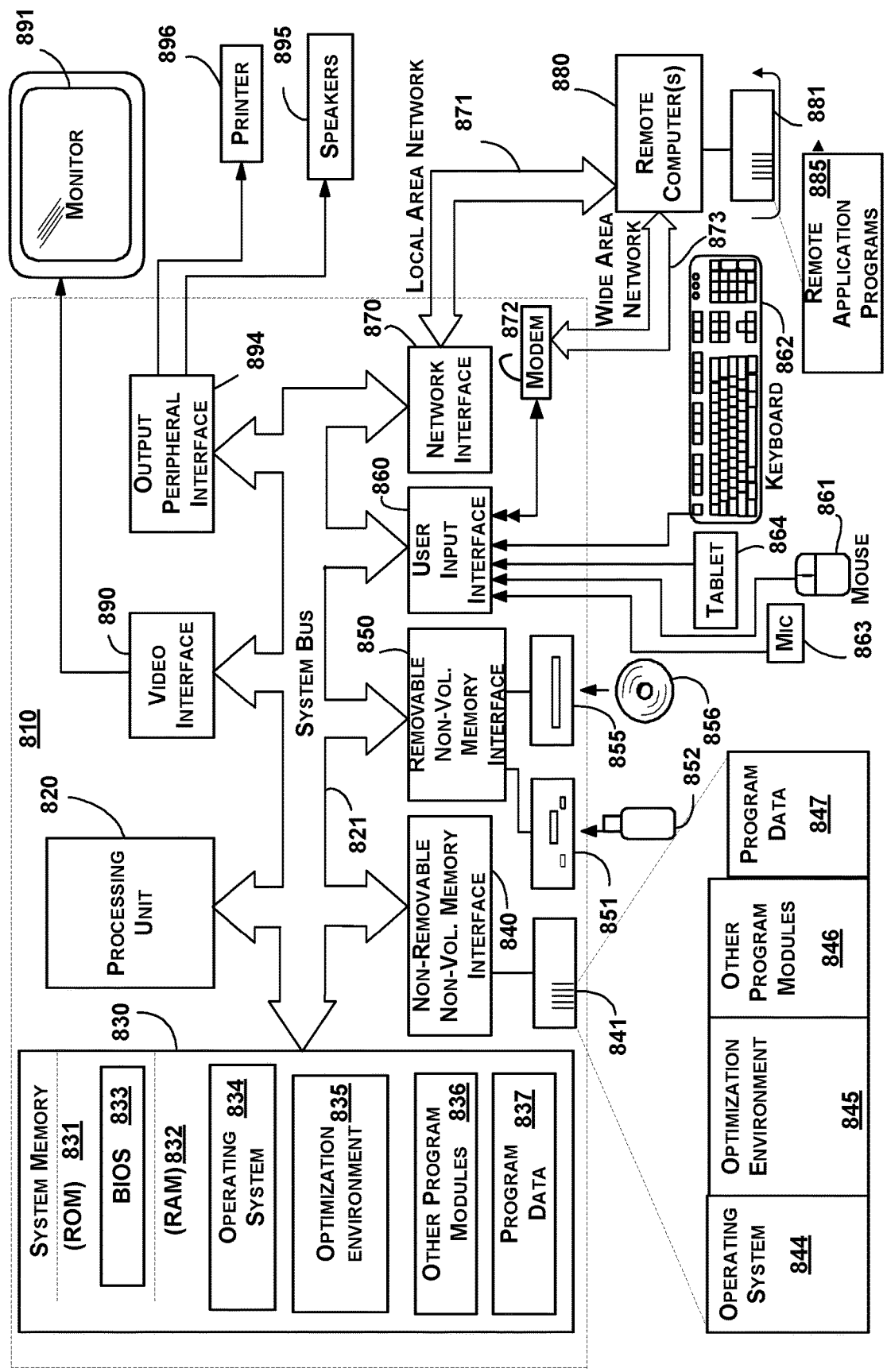
FIG. 8 is an exemplary block diagram illustrating an operating environment for a computing device implementing developer environment.

FIG. 8 illustrates an example of a suitable computing and networking environment 800 on which the examples of FIG. 1 may be implemented. The computing system environment 800 is only one example of a suitable computing environment and is not intended to suggest any limitation as to the scope of use or functionality of the disclosure. Neither should the computing environment 800 be interpreted as having any dependency or requirement relating to any one or combination of components illustrated in the exemplary operating environment 800.

The disclosure is operational with numerous other general purpose or special purpose computing system environments or configurations. Examples of well-known computing systems, environments, and/or configurations that may be suitable for use with the disclosure include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The disclosure may be described in the general context of computer-executable instructions, such as program modules, being executed by a computer. Generally, program modules include routines, programs, objects, components, data structures, and so forth, which perform particular tasks or implement particular abstract data types. The disclosure may also be practiced in distributed computing environments where tasks are performed by remote processing devices that are linked through a communications network. In a distributed computing environment, program modules may be located in local and/or remote computer storage media including memory storage devices and/or computer storage devices. As used herein, computer storage devices refer to hardware devices.

With reference to FIG. 8, an exemplary system for implementing various aspects of the disclosure may include a general purpose computing device in the form of a computer 810. Components of the computer 810 may include, but are not limited to, a processing unit 820, a system memory 830, and a system bus 821 that couples various system components including the system memory 830 to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 810 typically includes a variety of computer-readable media. Computer-readable media may be any available media that may be accessed by the computer 810 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or the like. Memory 831 and 832 are examples of computer storage media. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by the computer 810. Computer storage media does not, however, include propagated signals. Rather, computer storage media excludes propagated signals. Any such computer storage media may be part of computer 810.

Communication media typically embodies computer-readable instructions, data structures, program modules or the like in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 8 illustrates operating system 834, application programs, such as optimization environment 835, other program modules 836 and program data 837.

The computer 810 may also include other removable/non-removable, volatile/nonvolatile computer storage media. By way of example only, FIG. 8 illustrates a hard disk drive 841 that reads from or writes to non-removable, nonvolatile magnetic media, a universal serial bus (USB) port 851 that provides for reads from or writes to a removable, nonvolatile memory 852, and an optical disk drive 855 that reads from or writes to a removable, nonvolatile optical disk 856 such as a CD ROM or other optical media. Other removable/non-removable, volatile/nonvolatile computer storage media that may be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and USB port 851 and optical disk drive 855 are typically connected to the system bus 821 by a removable memory interface, such as interface 850.

The drives and their associated computer storage media, described above and illustrated in FIG. 8, provide storage of computer-readable instructions, data structures, program modules and other data for the computer 810. In FIG. 8, for example, hard disk drive 841 is illustrated as storing operating system 844, optimization environment 845, other program modules 846 and program data 847. Note that these components may either be the same as or different from operating system 834, optimization environment 835, other program modules 836, and program data 837. Operating system 844, optimization environment 845, other program modules 846, and program data 847 are given different numbers herein to illustrate that, at a minimum, they are different copies. A user may enter commands and information into the computer 810 through input devices such as a tablet, or electronic digitizer 864, a microphone 863, a keyboard 862 and pointing device 861, commonly referred to as mouse, trackball or touch pad. Other input devices not shown in FIG. 8 may include a joystick, game pad, satellite dish, scanner, or the like. These and other input devices are often connected to the processing unit 820 through a user input interface 860 that is coupled to the system bus 821, but may be connected by other interface and bus structures, such as a parallel port, game port or a universal serial bus (USB). A monitor 891 or other type of display device is also connected to the system bus 821 via an interface, such as a video interface 890. The monitor 891 may also be integrated with a touch-screen panel or the like. Note that the monitor and/or touch screen panel may be physically coupled to a housing in which the computing device 810 is incorporated, such as in a tablet-type personal computer. In addition, computers such as the computer 810 may also include other peripheral output devices such as speakers 895 and printer 896, which may be connected through an output peripheral interface 894 or the like.

The computer 810 may operate in a networked environment using logical connections to one or more remote computers, such as a remote computer 880. The remote computer 880 may be a personal computer, a server, a router, a network PC, a peer device or other common network node, and typically includes many or all of the elements described above relative to the computer 810, although only a memory storage device 881 has been illustrated in FIG. 8. The logical connections depicted in FIG. 8 include one or more local area networks (LAN) 871 and one or more wide area networks (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860 or other appropriate mechanism. A wireless networking component such as comprising an interface and antenna may be coupled through a suitable device such as an access point or peer computer to a WAN or LAN. In a networked environment, program modules depicted relative to the computer 810, or portions thereof, may be stored in the remote memory storage device 881. By way of example, and not limitation, FIG. 8 illustrates remote application programs 885 as residing on remote memory storage device 881. It may be appreciated that the network connections shown are exemplary and other means of establishing a communications link between the computers may be used.

The examples illustrated and described herein as well as examples not specifically described herein but within the scope of aspects of the disclosure constitute an exemplary item-specific value optimization environment. For example, the elements illustrated in FIG. 1 and FIG. 2, such as when encoded to perform the operations illustrated in FIG. 3 and FIG. 4, constitute exemplary means for receiving a data request for an item; exemplary means for generating one or more entity-specific item value arrays, each corresponding to an individual entity; exemplary means for generating volume data associated with the item based on the item value arrays; exemplary means for calculating individual durations for individual item values based on the volume data; exemplary means for identifying one or more overlapping intervals of an individual item value between two or more individual entities; exemplary means for calculating one or more overlap durations for the identified one or more overlapping intervals; exemplary means for filtering out the calculated overlap durations as the calculated individual durations are computed for the individual item values; exemplary means for identifying one or more entity-specific factors associated with the item-entity data; exemplary means for normalizing the volume data based on the one or more entity-specific factors and the individual durations; and exemplary means for generating an item-specific value optimization output based on the normalized volume data.

Alternatively, or in addition to the other examples described herein, examples include any combination of the following:
- wherein the value optimization module further calculates the individual durations for the individual item values including by identifying one or more overlapping intervals of an individual item value between two or more individual entities;
- calculating one or more overlap durations for the identified one or more overlapping intervals;
- filtering out the calculated one or more overlap durations as the calculated individual durations are computed for the individual item values;
- wherein the value optimization module further identifies inventory data for the item at a per-individual entity basis using the obtained item-entity data;
- determines whether the inventory data for the item indicates an absent inventory status;
- in response to a determination that the absent inventory status is indicated for the item, calculates a duration associated with the absent inventory status for the item based on the identified inventory data;
- adjusts the volume data associated with the item based on the calculated duration associated with the absent inventory status;
- wherein the value optimization module further identifies transaction data for the item at a per-individual entity basis using the obtained item-entity data;
- determines whether the transaction data for the item indicates an absent volume status for one or more dates;
- in response to a determination that the absent volume status is indicated for the item for the one or more dates, calculates the individual item values for the item for individual dates of the one or more dates;
- adjusts the volume data associated with the item based on the calculated individual item values;
- wherein calculating the individual item values for the item for an individual date of the one or more dates further includes identifying a nearest previous date relative to the individual date, the nearest previous date having a corresponding item value for the item, and generating a date-value pair for the individual date using the corresponding item value of the identified nearest previous date;
- further comprising an elasticity estimation module implemented on the at least one processor, that obtains the item-entity data and the generated item-specific value optimization output;
- identifies a value response curve for the item using the obtained item-entity data and the generated item-specific value optimization output;
- generates an item-specific elasticity measure for the item;
- a lost sale component, the lost sale component configured to provide an indication to the elasticity estimation module as to whether a lost sale factor applies to the item associated with the individual entity for a given time period, such that the determined elasticity measure for the item is calculated at least in part using the lost sale factor;
- further comprising an impact estimation component that obtains the item-entity data and the normalized volume data;
- obtains competitor data;
- calculates item affinity and item substitutability data for the item;
- integrates the obtained item-entity data, the normalized volume data, and the competitor data with the calculated item affinity and item substitutability data to generate integrated item data;
- applies outlier treatment to the integrated item data;
- processes the integrated item data using a number of machine learning models;
- calculates individual mean absolute percentage errors for the processed integrated item data for each of the number of machine learning models;
- selects a model based on the calculated individual mean absolute percentage errors;
- calculates an item-specific elasticity value for the item based on the selected model;
- wherein the individual entity is a specific retail store location;
- wherein calculating the individual durations for the individual item values further comprises identifying one or more overlapping intervals of an individual item value between two or more individual entities;
- calculating one or more overlap durations for the identified one or more overlapping intervals;
- filtering out the calculated overlap durations as the calculated individual durations are computed for the individual item values;
- identifying inventory data for the item at a per-individual entity basis using the obtained item-entity data;
- determining whether the inventory data for the item indicates an absent inventory status;
- in response to a determination that the absent inventory status is indicated for the item, calculating a duration associated with the absent inventory status for the item based on the identified inventory data;
- adjusting the volume data associated with the item based on the calculated duration associated with the absent inventory status;
- identifying transaction data for the item at a per-individual entity basis using the obtained item-entity data;
- determining whether the transaction data for the item indicates an absent volume status for one or more dates;
- in response to a determination that the absent volume status is indicated for the item for the one or more dates, calculating the individual item values for the item for individual dates of the one or more dates;
- adjusting the volume data associated with the item based on the calculated individual item values;

identifying a nearest previous date relative to the individual date, the nearest previous date having a corresponding item value for the item;
generating a date-value pair for the individual date using the corresponding item value of the identified nearest previous date;
obtaining, by an impact estimation component, the item-entity data and the normalized volume data
obtaining competitor data;
calculating item affinity and item substitutability data for the item;
integrating the obtained item-entity data, the normalized volume data, and the competitor data with the calculated item affinity and item substitutability data to generate integrated item data;
applying outlier treatment to the integrated item data;
processing the integrated item data using a number of machine learning models;
calculating individual mean absolute percentage errors for the processed integrated item data for each of the number of machine learning models;
selecting a model based on the calculated individual mean absolute percentage errors;
calculating an item-specific elasticity value for the item based on the selected model;
wherein calculating the individual durations for the individual item values further comprises identifying one or more overlapping intervals of an individual item value between two or more individual entities;
calculating one or more overlap durations for the identified one or more overlapping intervals;
filtering out the calculated overlap durations as the calculated individual durations are computed for the individual item values;
identifying inventory data for the item at a per-individual entity basis using the obtained item-entity data;
determining whether the inventory data for the item indicates an absent inventory status;
in response to a determination that the absent inventory status is indicated for the item, calculating a duration associated with the absent inventory status for the item based on the identified inventory data;
adjusting the volume data associated with the item based on the calculated duration associated with the absent inventory status;
identifying transaction data for the item at a per-individual entity basis using the obtained item-entity data;
determining whether the transaction data for the item indicates an absent volume status for one or more dates;
in response to a determination that the absent volume status is indicated for the item for the one or more dates, calculating the individual item values for the item for individual dates of the one or more dates;
adjusting the volume data associated with the item based on the calculated individual item values;
identifying a nearest previous date relative to the individual date, the nearest previous date having a corresponding item value for the item;
generating a date-value pair for the individual date using the corresponding item value of the identified nearest previous date The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of" The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

While the disclosure is susceptible to various modifications and alternative constructions, certain illustrated examples thereof are shown in the drawings and have been described above in detail. It should be understood, however, that there is no intention to limit the disclosure to the specific forms disclosed, but on the contrary, the intention is to cover all modifications, alternative constructions, and equivalents falling within the spirit and scope of the disclosure.

What is claimed is:

1. A system for item-specific value optimization, the system comprising:
    an interface coupled to a communication network;
    at least one processor coupled to the interface via the communication network;
    a value optimization module, implemented on the at least one processor, that:
        receives a data request for an item;
        obtains item-entity data corresponding to the item and one or more individual entities;
        generates one or more entity-specific item value arrays for the item based on the obtained item-entity data, an individual entity-specific item value array corresponding to an individual entity, the one or more entity-specific item value arrays including one or more item values associated with the item and one or more timestamps associated with the one or more item values;
        generates volume data associated with the item based on the generated one or more entity-specific item value arrays, the volume data including a number of value-volume pairs, a number of volume-date pairs, and a number of date-value pairs, wherein the number of value-volume pairs is a quantity of the item sold at the item value, the number of volume-date pairs is the quantity of the item sold for each and every date, and the number of date-value pairs is a price point of the item for the each and every date; and
        calculates individual durations for individual item values of the one or more item values based on the generated volume data; and
    a normalization module communicatively coupled to the value optimization module that:

identifies one or more entity-specific factors associated with the item-entity data;

normalizes the generated volume data based on the one or more entity-specific factors and the calculated individual durations; and integrates the item-entity data and the normalized volume data;

executes a plurality of machine learning models to process the integrated item-entity data and normalized volume data, wherein the processing includes:
creating a training dataset using the generated volume data,
building a test dataset to test the plurality of machine learning models,
testing the built test dataset using the plurality of machine learning models, and
selecting a final machine learning model, of the plurality of machine learning models, based at least in part on the final machine learning model having a lowest mean absolute percentage error of the plurality of machine learning models; and generates an item-specific value optimization output based on the normalized volume data and the selected final machine learning model, the generated item-specific value optimization output automatically addressing lost sales opportunities.

2. The system of claim 1, wherein the value optimization module further calculates the individual durations for the individual item values including by:
identifying one or more overlapping intervals of an individual item value between two or more individual entities;
calculating one or more overlap durations for the identified one or more overlapping intervals; and
filtering out the calculated one or more overlap durations as the calculated individual durations are computed for the individual item values.

3. The system of claim 1, wherein the value optimization module further:
identifies inventory data for the item at a per-individual entity basis using the obtained item-entity data;
determines whether the inventory data for the item indicates an absent inventory status;
in response to a determination that the absent inventory status is indicated for the item, calculates a duration associated with the absent inventory status for the item based on the identified inventory data; and
adjusts the volume data associated with the item based on the calculated duration associated with the absent inventory status.

4. The system of claim 1, wherein the value optimization module further:
identifies transaction data for the item at a per-individual entity basis using the obtained item-entity data;
determines whether the transaction data for the item indicates an absent volume status for one or more dates;
in response to a determination that the absent volume status is indicated for the item for the one or more dates, calculates the individual item values for the item for individual dates of the one or more dates; and
adjusts the volume data associated with the item based on the calculated individual item values.

5. The system of claim 4, wherein calculating the individual item values for the item for an individual date of the one or more dates further includes identifying a nearest previous date relative to the individual date, the nearest previous date having a corresponding item value for the item, and generating a date-value pair for the individual date using the corresponding item value of the identified nearest previous date.

6. The system of claim 1, further comprising:
an elasticity estimation module, implemented on the at least one processor, that:
obtains the item-entity data and the generated item-specific value optimization output;
identifies a value response curve for the item using the obtained item-entity data and the generated item-specific value optimization output; and
generates an item-specific elasticity measure for the item.

7. The system of claim 6, wherein the elasticity estimation module further comprises:
a lost sale component, the lost sale component configured to provide an indication to the elasticity estimation module as to whether a lost sale factor applies to the item associated with the individual entity for a given time period, such that the generated elasticity measure for the item is calculated at least in part using the lost sale factor.

8. The system of claim 1, further comprising:
an impact estimation component that:
obtains the item-entity data and the normalized volume data;
obtains competitor data;
calculates item affinity and item substitutability data for the item;
integrates the obtained item-entity data, the normalized volume data, and the competitor data with the calculated item affinity and item substitutability data to generate integrated item data;
applies outlier treatment to the integrated item data;
processes the integrated item data using the plurality of machine learning models;
calculates individual mean absolute percentage errors for the processed integrated item data for each of the plurality of machine learning models;
selects the final machine learning model based on the calculated individual mean absolute percentage errors; and
calculates an item-specific elasticity value for the item based on the selected final machine learning model.

9. The system of claim 1, wherein the individual entity is a specific retail store location, and
the entity-specific factors include at least one of a format of the individual entity, a size of the individual entity, a region of the individual entity, or an inventory of the individual entity, the format being a variable type of the entity within a larger entity environment, the size being an available square footage of space for the individual entity, the region being a geo-physical location of the individual entity, and the inventory being information regarding other items, products, or services provided by or offered at the individual entity.

10. A method for item-specific value optimization implemented on at least one processor, comprising:
receiving, by a value optimization component implemented on the at least one processor, a data request for an item;
obtaining item-entity data corresponding to the item and one or more individual entities;
generating one or more entity-specific item value arrays for the item based on the obtained item-entity data, an individual entity-specific item value array corresponding to an individual entity, the one or more entity-specific item value arrays including one or more item values associated with the item and one or more timestamps associated with the one or more item values;

generating volume data associated with the item based on the generated one or more entity-specific item value arrays, the volume data including a number of value-volume pairs, a number of volume-date pairs, and a number of date-value pairs, wherein the number of value-volume pairs is a quantity of the item sold at the item value, the number of volume-date pairs is the quantity of the item sold for each and every date, and the number of date-value pairs is a price point of the item for the each and every date;

calculating individual durations for individual item values of the one or more item values based on the generated volume data;

identifying, by a normalization component communicatively coupled to the value optimization component, one or more entity-specific factors associated with the item-entity data;

normalizing the generated volume data based on the one or more entity-specific factors and the calculated individual durations;

integrating the item-entity data and the normalized volume data;

executing a plurality of machine learning models to process the integrated item-entity data and normalized volume data, wherein the processing includes:
  creating a training dataset using the generated volume data,
  building a test dataset to test the plurality of machine learning models,
  testing the built test dataset using the plurality of machine learning models, and
  selecting a final machine learning model, of the plurality of machine learning models, based at least in part on the final machine learning model having a lowest mean absolute percentage error of the plurality of machine learning models; and generating an item-specific value optimization output based on the normalized volume data and the selected final machine learning model, the generated item-specific value optimization output automatically addressing lost sales opportunities.

11. The method of claim 10, wherein calculating the individual durations for the individual item values further comprises:
  identifying one or more overlapping intervals of an individual item value between two or more individual entities;
  calculating one or more overlap durations for the identified one or more overlapping intervals; and
  filtering out the calculated overlap durations as the calculated individual durations are computed for the individual item values.

12. The method of claim 10, further comprising:
  identifying inventory data for the item at a per-individual entity basis using the obtained item-entity data;
  determining whether the inventory data for the item indicates an absent inventory status;
  in response to a determination that the absent inventory status is indicated for the item, calculating a duration associated with the absent inventory status for the item based on the identified inventory data; and
  adjusting the volume data associated with the item based on the calculated duration associated with the absent inventory status.

13. The method of claim 10, further comprising:
  identifying transaction data for the item at a per-individual entity basis using the obtained item-entity data;
  determining whether the transaction data for the item indicates an absent volume status for one or more dates;
  in response to a determination that the absent volume status is indicated for the item for the one or more dates, calculating the individual item values for the item for individual dates of the one or more dates; and
  adjusting the volume data associated with the item based on the calculated individual item values.

14. The method of claim 13, wherein calculating the individual item values for the item for an individual date of the one or more dates further comprises:
  identifying a nearest previous date relative to the individual date, the nearest previous date having a corresponding item value for the item; and
  generating a date-value pair for the individual date using the corresponding item value of the identified nearest previous date.

15. The method of claim 10, further comprising:
  obtaining, by an impact estimation component, the item-entity data and the normalized volume data;
  obtaining competitor data;
  calculating item affinity and item substitutability data for the item;
  integrating the obtained item-entity data, the normalized volume data, and the competitor data with the calculated item affinity and item substitutability data to generate integrated item data;
  applying outlier treatment to the integrated item data;
  processing the integrated item data using the plurality of machine learning models;
  calculating individual mean absolute percentage errors for the processed integrated item data for each of the plurality of machine learning models;
  selecting the final machine learning model based on the calculated individual mean absolute percentage errors; and
  calculating an item-specific elasticity value for the item based on the selected final machine learning model.

16. One or more computer storage devices having computer-executable instructions stored thereon for item-specific value optimization, which, on execution by a computer, cause the computer to perform operations comprising:
  receiving, by a value optimization component, a data request for an item;
  obtaining item-entity data corresponding to the item and one or more individual entities;
  generating one or more entity-specific item value arrays for the item based on the obtained item-entity data, an individual entity-specific item value array corresponding to an individual entity, the one or more entity-specific item value arrays including one or more item values associated with the item and one or more timestamps associated with the one or more item values;
  generating volume data associated with the item based on the generated one or more entity-specific item value arrays, the volume data including a number of value-volume pairs, a number of volume-date pairs, and a number of date-value pairs, wherein the number of value-volume pairs is a quantity of the item sold at the item value, the number of volume-date pairs is the quantity of the item sold for each and every date, and the number of date-value pairs is a price point of the item for the each and every date;

calculating individual durations for individual item values of the one or more item values based on the generated volume data;

identifying, by a normalization component communicatively coupled to the value optimization component, one or more entity-specific factors associated with the item-entity data;

normalizing the generated volume data based on the one or more entity-specific factors and the calculated individual durations;

integrating the item-entity data and the normalized volume data;

executing a plurality of machine learning models to process the integrated item-entity data and normalized volume data, wherein the processing includes:
  creating a training dataset using the generated volume data,
  building a test dataset to test the plurality of machine learning models,
  testing the built test dataset using the plurality of machine learning models, and
  selecting a final machine learning model, of the plurality of machine learning models, based at least in part on the final machine learning model having a lowest mean absolute percentage error of the plurality of machine learning models; and generating an item-specific value optimization output based on the normalized volume data and the selected final machine learning model, the generated item-specific value optimization output automatically addressing lost sales opportunities.

17. The one or more computer storage devices of claim 16, wherein calculating the individual durations for the individual item values further comprises:
  identifying one or more overlapping intervals of an individual item value between two or more individual entities;
  calculating one or more overlap durations for the identified one or more overlapping intervals; and
  filtering out the calculated overlap durations as the calculated individual durations are computed for the individual item values.

18. The one or more computer storage devices of claim 16, having further computer-executable instructions that cause the computer to perform operations comprising:
  identifying inventory data for the item at a per-individual entity basis using the obtained item-entity data;
  determining whether the inventory data for the item indicates an absent inventory status;
  in response to a determination that the absent inventory status is indicated for the item, calculating a duration associated with the absent inventory status for the item based on the identified inventory data; and
  adjusting the volume data associated with the item based on the calculated duration associated with the absent inventory status.

19. The one or more computer storage devices of claim 16, having further computer-executable instructions that cause the computer to perform operations comprising:
  identifying transaction data for the item at a per-individual entity basis using the obtained item-entity data;
  determining whether the transaction data for the item indicates an absent volume status for one or more dates;
  in response to a determination that the absent volume status is indicated for the item for the one or more dates, calculating the individual item values for the item for individual dates of the one or more dates; and
  adjusting the volume data associated with the item based on the calculated individual item values.

20. The one or more computer storage devices of claim 19, wherein calculating the individual item values for the item for the individual date of the one or more dates further comprises:
  identifying a nearest previous date relative to the individual date, the nearest previous date having a corresponding item value for the item; and
  generating a date-value pair for the individual date using the corresponding item value of the identified nearest previous date.

* * * * *